United States Patent
Chen et al.

(10) Patent No.: US 11,012,435 B2
(45) Date of Patent: *May 18, 2021

(54) MULTI FACTOR AUTHENTICATION

(71) Applicant: INTERNATIONAL BUSINESS MACHINES CORPORATION, Armonk, NY (US)

(72) Inventors: Yi-Chun Chen, Taipei (TW); Wen-Ping Chi, New Taipei (TW); Chao Yuan Huang, Taipei (TW); Ting-Yi Wang, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 598 days.

This patent is subject to a terminal disclaimer.

(21) Appl. No.: 15/847,884

(22) Filed: Dec. 19, 2017

(65) Prior Publication Data
US 2019/0190904 A1  Jun. 20, 2019

(51) Int. Cl.
*H04L 29/06* (2006.01)
*G06F 21/44* (2013.01)

(52) U.S. Cl.
CPC ............ *H04L 63/083* (2013.01); *G06F 21/44* (2013.01); *H04L 63/18* (2013.01);
(Continued)

(58) Field of Classification Search
CPC ..... H04L 63/083; H04L 63/18; H04L 63/168; H04L 2463/082; G06F 21/44; G06F 2221/2103
See application file for complete search history.

(56) References Cited

U.S. PATENT DOCUMENTS

| 5,497,423 A | 3/1996 | Miyaji |
| 5,521,980 A | 5/1996 | Brands |

(Continued)

FOREIGN PATENT DOCUMENTS

| EP | 3144844 A1 | 3/2017 |
| WO | 2014209781 A1 | 12/2014 |
| WO | 2016092286 A1 | 6/2016 |

OTHER PUBLICATIONS

Message Recovery for Signature Schemes Based on the Discrete Logarithm Problem (Year: 1996).*

(Continued)

*Primary Examiner* — Kendall Dolly
(74) *Attorney, Agent, or Firm* — Intelletek Law Group, PLLC; Gabriel Daniel, Esq.

(57) ABSTRACT

A method and system of authenticating a user are provided. A request for a resource is received from a user device. A predefined number is received. A first number and a second number are created. A first discrete logarithm based on the first number and the predefined number is determined and sent to the user device, together with the second number. A second discrete logarithm is received from the user device. A first pass code is calculated via a third discrete logarithm, based on the second discrete logarithm, the first number, and the predefined number. A second pass code is received via a fourth discrete logarithm, based on the first discrete logarithm, the third number, and the predefined number. Upon determining that the first pass code is identical to the second pass code, the user device is allowed to access a resource associated with the computing device.

24 Claims, 5 Drawing Sheets

(52) U.S. Cl.
CPC .... *G06F 2221/2103* (2013.01); *H04L 63/168* (2013.01); *H04L 2463/082* (2013.01)

(56) References Cited

U.S. PATENT DOCUMENTS

| | | | |
|---|---|---|---|
| 5,987,134 | A | 11/1999 | Shin et al. |
| 6,226,383 | B1 | 5/2001 | Jablon |
| 6,282,295 | B1 | 8/2001 | Young et al. |
| 6,718,467 | B1 | 4/2004 | Trostle |
| 6,850,252 | B1 | 2/2005 | Hoffberg |
| 7,000,110 | B1 | 2/2006 | Terao |
| 7,567,672 | B2 | 7/2009 | Furukawa |
| RE42,762 | E | 9/2011 | Shin et al. |
| 8,036,384 | B2 | 10/2011 | Zick |
| 8,411,854 | B2 | 4/2013 | Grzonkowski |
| 8,850,540 | B2 | 9/2014 | Lin |
| 8,918,647 | B1 | 12/2014 | Wallrabenstein |
| 9,060,271 | B2 | 6/2015 | Mardikar |
| 9,313,198 | B2 | 4/2016 | Johnson |
| 10,375,063 | B2 | 8/2019 | Rotem et al. |
| 10,425,224 | B1 | 9/2019 | Peddada et al. |
| 10,771,267 | B2 | 9/2020 | Wallrabenstein |
| 10,778,659 | B2 | 9/2020 | Tola |
| 2002/0025046 | A1* | 2/2002 | Lin .................. H04L 9/321 380/282 |
| 2003/0044004 | A1 | 3/2003 | Blakley et al. |
| 2003/0065692 | A1 | 4/2003 | Furukawa et al. |
| 2004/0030906 | A1 | 2/2004 | Marmigere et al. |
| 2005/0235148 | A1 | 10/2005 | Scheidt |
| 2006/0126848 | A1 | 6/2006 | Park et al. |
| 2006/0135177 | A1 | 6/2006 | Winterbottom et al. |
| 2006/0161772 | A1 | 7/2006 | Talstra et al. |
| 2006/0179319 | A1 | 8/2006 | Krawczyk |
| 2006/0215837 | A1 | 9/2006 | Chen et al. |
| 2007/0107050 | A1 | 5/2007 | Selvarajan |
| 2010/0042838 | A1 | 2/2010 | Ho |
| 2011/0004924 | A1 | 1/2011 | Farrell et al. |
| 2012/0204242 | A1 | 8/2012 | Cohen |
| 2013/0179350 | A1 | 7/2013 | Kirillin et al. |
| 2014/0282957 | A1 | 9/2014 | Thakore et al. |
| 2014/0310514 | A1 | 10/2014 | Favero |
| 2014/0368312 | A1 | 12/2014 | Robshaw |
| 2015/0124963 | A1* | 5/2015 | McCusker ............ H04L 9/3073 380/46 |
| 2015/0244525 | A1 | 8/2015 | McCusker et al. |
| 2015/0281191 | A1 | 10/2015 | Mardikar |
| 2017/0126733 | A1 | 5/2017 | Mathew et al. |
| 2017/0214679 | A1 | 7/2017 | Lin et al. |
| 2017/0339118 | A1* | 11/2017 | Hwang .................. H04L 9/3247 |
| 2018/0062863 | A1 | 3/2018 | Baskaran et al. |

OTHER PUBLICATIONS

WeGroup: A secure group access control tool for the world wide web (Year: 1998).*
Discrete Logarithm Based Protocols (Year: 1991).*
Demonstrating Possession of a Discrete Logarithm without revealing it (Year: 1987).*
Fadi Aloul et al., "Multi Factor Authentication Using Mobile Phones," International Journal of Mathematics and Computer Science, 4(2009), No. 2, 65-80.
Mohamed Hamdy Eldefrawy et al., "OTP-Based Two-Factor Authentication Using Mobile Phones," Information Technology: New Generations (ITNG), 2011 Eighth International Conference, 4 pages.
Safa Hamdare et al., "Securing SMS Based One Time Password Technique from Man in the Middle Attack," International Journal of Engineering Trends and Technology (IJETT), 11(3):154-158, May 2014.
Sagar Acharya et al., "Two Factor Authentication Using Smartphone Generated One Time Password," IOSR Journal of Computer Engineering (IOSR-JCE) e-ISSN: 2278-0661, p- ISSN: 2278-8727vol. 11, Issue 2 (May-Jun. 2013), pp. 85-90.
W. Diffle et al., "Public key cryptography using discrete logarithms," Copyright © 2013-16 DI Management Services Pty Limited ABN 78 083 210 584 Australia, https://www.di-mgt.com.au/public-key-crypto-discrete-logs-0.html.
Paul A. Grassi et al., "Digital Identity Guidelines, Authentication and Lifecycle Management," NIST Special Publication 800-63B, 95 pages (Jun. 2017), https://pages.nist.gov/800-63-3/sp800-63b.html#sec5.
List of IBM Patents or Applications Treated as Related.
Harini, N. et al., "2CAuth: A New Two Factor Authentication Scheme Using QR-Code"; IJET (2013); vol. 5, No. 2; pp. 1087-1094.

* cited by examiner

MULTI FACTOR AUTHENTICATION

BACKGROUND

Technical Field

The present disclosure generally relates to electronic communication, and more particularly, to protecting data that is transmitted via electronic communication.

Description of the Related Art

In recent years, there has been an increase in the security concern in digital data. Some of the industries that are affected include banking, healthcare, government organizations, educational institutions, social media, etc. Many traditional systems rely on static passwords to verify a user's identity, which are sometimes easy to guess or determined through social engineering tactics.

An improved security strategy is based on two factor authentication. For example, a website may have a user enter their username or cell phone number. If the username or cell phone number is registered, the website sends a text message, such as short message service (SMS) text message, to a user device of the user, with a password that the user is prompted to manually provide to the website. The website then compares the password it sent to the user device with the password the user entered. If they match, the user is considered authenticated and is logged in.

Existing systems using SMS have several disadvantages. It has recently been determined, that although two-factor authentication is used to increase security, most user devices are not adequately protected against hacking and malware. For example, a threat actor, hacker, or attacker, collectively referred to herein as a malicious party, can intercept or eavesdrop on the SMS communication without notice of the intended user. Stated differently, SMS relies on an active transaction between a server and a user device, which can be intercepted, thereby exposing a user to a security risk. Thus, the very message meant to keep a user safe can be a source of vulnerability. It is with respect to these considerations and others that the present disclosure has been written.

SUMMARY

According to various embodiments, a computing device, a non-transitory computer readable storage medium, and a method are provided to authenticate a user. A request for a resource is received from a user device. A predefined number (p) is received from the user device. A first number (c) and a second number (g) are created. A first discrete logarithm is determined based on the first number (c) and the predefined number (p). The first discrete logarithm and the second number (g) are sent to the user device. A second discrete logarithm is received from the user device based on a third number (s) generated by the user device, the predefined number (p), and the second number (g), from the user device. A first pass code ($R_1$) is calculated via a third discrete logarithm, based on the second discrete logarithm, the first number (c), and the predefined number (p). A second pass code ($R_2$) is received via a fourth discrete logarithm, based on the first discrete logarithm, the third number (s), and the predefined number (p), from the user device. The first pass code ($R_1$) is compared to the second pass code ($R_2$). Upon determining that the first pass code ($R_1$) is identical to the second pass code ($R_2$), the user device is allowed access to the resource.

In one embodiment, the receipt of the predefined number (p) by the computing device is over a channel that is different from that of sending the first discrete logarithm and the second number (g) to the user device.

In one embodiment, the first discrete logarithm is based on ($g^c$ mod p), the second discrete logarithm is based on ($g^s$ mod p), the third discrete logarithm is based on (($g^s$ mod p)$^c$ mod p), and the fourth discrete logarithm is based on (($g^c$ mod p)$^s$ mod p).

According to various embodiments, a computing device, a non-transitory computer readable storage medium, and a method are provided to authenticate a user. A request for a resource is sent from a computing device to a server. A predefined number (p) is sent to the server. The following are received from the server: (i) a first discrete logarithm based on the first number (c) and the predefined number (p) and (ii) and the second number (g). A third number (s) is generated by the computing device. A second discrete logarithm is determined based on a third number (s), the predefined number (p), and the second number (g). The second discrete logarithm is sent to the server. A second pass code ($R_2$) is calculated via a fourth discrete logarithm, based on the first discrete logarithm, the third number (s), and the predefined number (p). The second pass code ($R_2$) is sent to the server for comparison to a first pass code $R_1$ based on the second discrete logarithm, the first number (c), and the predefined number (p). Upon the second pass code ($R_2$) being identical to the first pass code ($R_1$), the computing device receives access to the secure resource.

In one embodiment, the sending of the predefined number (p) by the computing device is over a channel that is different from that of receiving the first discrete logarithm and the second number (g) from the server.

In one embodiment, the first discrete logarithm is based on ($g^c$ mod p), the second discrete logarithm is based on ($g^s$ mod p), the third discrete logarithm is based on (($g^s$ mod p)$^c$ mod p), and the fourth discrete logarithm is based on (($g^c$ mod p)$^s$ mod p).

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

The present disclosure relates to protecting data that is transmitted via electronic communication. The data is protected via multi-factor authentication that reduces vulnerability of the data during the authentication process, even if the electronic communication during authentication is intercepted by a malicious party. Both the server that stores the data to be protected, as well as the user device soliciting the protected data, can determine a same passcode even though messages that are transmitted through digital communication during the authentication process do not compromise the security of the data to be protected. To that end, the server performing the authentication does not send out a passcode to the user device of a requestor user. Rather, at least part of the parameters related to the authentication known by the server are kept secret by the server, and at least part of the parameters related to the authentication known by the user device are kept secret at the user side. By virtue of the concepts discussed herein, the passcode is protected even though a communication between the server and the user device is intercepted by a malicious third party. Reference now is made in detail to the examples illustrated in the accompanying drawings and discussed below.

Example Architecture

Figure 1:
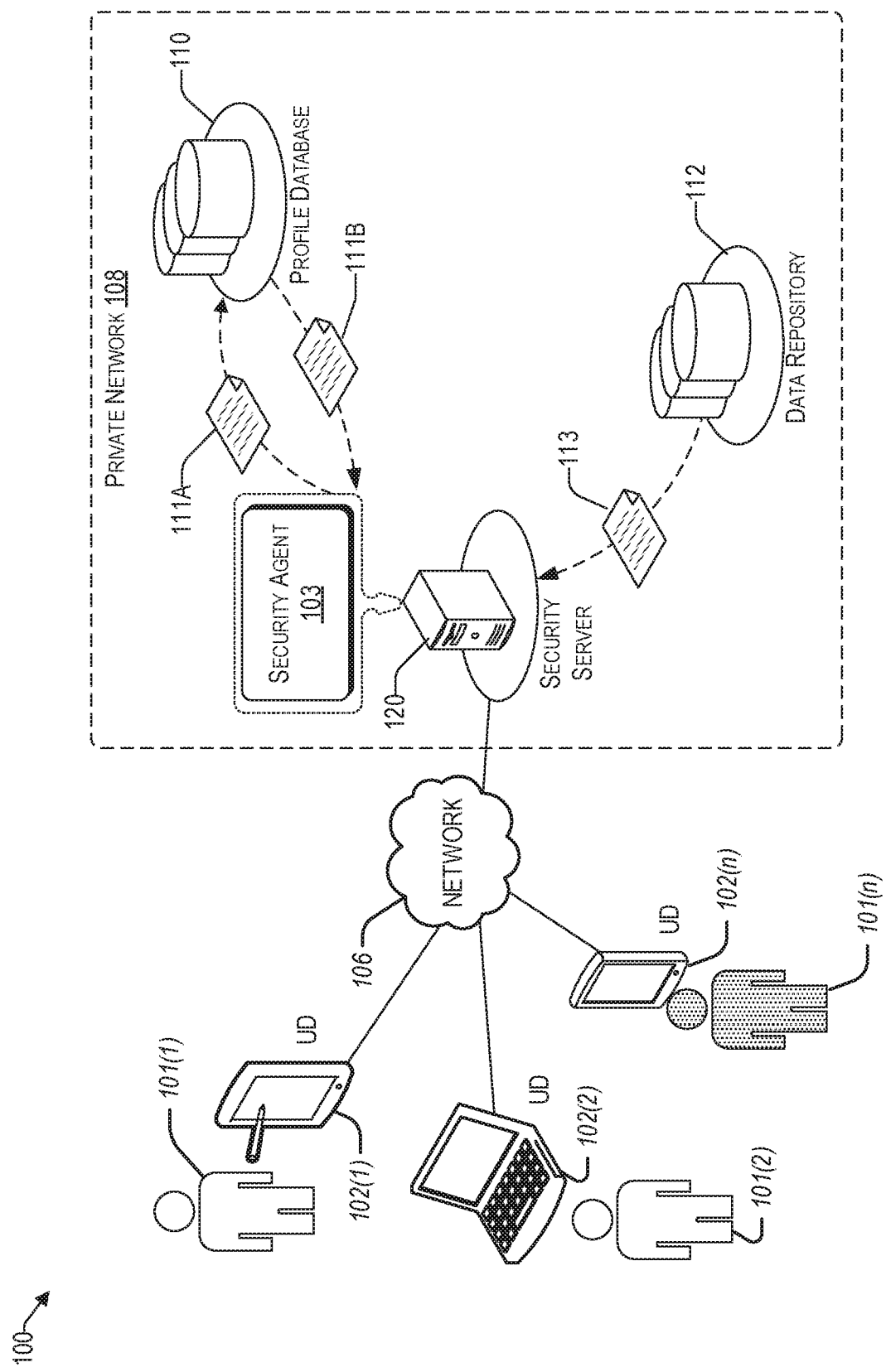
FIG. 1 illustrates an example architecture 100 for providing secure multi-factor authentication.

FIG. 1 illustrates an example architecture 100 for providing secure multi-factor authentication. Architecture 100 includes a network 106 that allows various user devices 102(1) to 102(n) to communicate with each other, as well as any other resources that may be connected to the network 106, including banks, government organizations, healthcare portals, educational institutions, social media portals, etc., that may be used to store information that a user intends to protect. These institutions and portals are represented herein by way of the private network 108 having a security server 120.

The network 106 may be, without limitation, a local area network ("LAN"), a virtual private network ("VPN"), a cellular network, a public switched telephone network (PTSN), the Internet, or a combination thereof. For example, the network 106 may include a mobile network that is communicatively coupled to a private network that provides various ancillary services, such as communication with various application stores, libraries, and the Internet. To facilitate the present discussion, network 106 will be described, by way of example only and not by way of limitation, as a mobile network as may be operated by a carrier or service provider to provide a wide range of mobile communication services and supplemental services or features to its subscriber customers and associated mobile device users.

The network 106 allows one or more users 101(1) to 101(n) to communicate with one or more private networks 108 to securely retrieve information from or store information at the private network, over their user devices (UD's) 102(1) to 102(n), respectively. As mentioned above, these private networks 108 may represent the networks of different institutions and portals that a user may be subscribed to. The private network 108 includes a security server 120 that has a software application running thereon, represented by security agent 103. In one embodiment, the private network includes a profile database 110 that may include subscriptions, payment status information, password information, identification information, etc., of users who are authorized to use the private network 108 and their respective protected data 113. In one embodiment, the security agent 103 may store predefined numbers 111A, such as an identification (ID) number of the user device, in the profile database 110. The stored information can then be retrieved 111B from the profile database 110 during an authentication process.

For purposes of later discussion, several user devices appear in the drawing, to represent some examples of the devices that may be used to initiate a communication with the private network 108. Today, user devices typically take the form of portable handsets, smart-phones, tablet computers, personal digital assistants (PDAs), virtual reality (VR) devices, augmented reality (AR) devices, and smart watches, although they may be implemented in other form factors, including consumer, and business electronic devices. A user device (e.g., 102(1)) may be used to interact with the private network 108 over the network 106, to receive one or more resources provided by the private network 108, including retrieving and storing protected data 113 in a repository 112 associated with the security server 120.

In some scenarios a malicious party, represented in FIG. 1 by user 101(n) and their corresponding user device 102(n), may try to intercept the communication between an authorized user (e.g., 101(1) or 101(2)) via deceptive practices, which may be as simple as eavesdropping the communication on a user device 102(2) of an authorized user 101(2), electronically intercepting the communication over the network 106, etc. The architecture 100 is configured to maintain the security of the data 113 intended to be protected despite the interception by a malicious party 102(n).

To that end, the security agent 103 is operative to be a gateway between the protected data 113 in the data repository 112 and one or more users 101(1) to 101(n). For example, the security agent 103 is configured to receive requests from users via their respective user devices for data stored (or intended to be stored) in the private network 108 (e.g., in a data repository 112). The security agent 103 is also configured to determine whether the user is authorized to communicate with the private network 108 via authentication processes discussed in more detail later. In various embodiments, the authentication process performed by the security agent may include sending passcodes to and receiving passcodes from a user device (e.g., 102(1)). For example, the security agent 103 may receive a predefined number from the user device 102(1), which may later be used for data obfuscation based on a modular exponential, referred to herein as a discrete logarithm.

Discrete logarithms are logarithms within the context of multiplicative groups that are cyclical. For example, if G is a multiplicative cyclic group and g is a generator of G, then from the definition of cyclic groups, every element h in G can be written as $g^x$ for some x. The discrete logarithm to the base g of h in the group G is defined to be x. While discrete logarithms can be calculated based on known parameters, the root parameter(s) are obfuscated, making parameters inherent in discrete logarithms computationally challenging to decipher.

In some embodiments, a security alarm (i.e., alert notification) may be raised and sent to one or more appropriate accounts of recipients upon determining that a user who is attempting to access information of the private network 108 is not authorized. An appropriate recipient may be the account holder (i.e., user) of the protected data 113, an IT administrator of the private network 108, a security agent of the private network 108, etc. The alert notification may be sent in various ways, such as common short code (CSC) using a short message service (SMS), multimedia message service (MMS), e-mail, telephone, social media, etc.

While the security server 120, profile database 110, and data repository 112 are illustrated by way of example to be on different platforms, it will be understood that in various embodiments, the security server 120, profile database 110, and data repository 112 may be combined in various combinations. In other embodiments, these computing platforms may be implemented by virtual computing devices in the form of virtual machines or software containers that are hosted in a cloud, thereby providing an elastic architecture for processing and storage.

Example User Device

Figure 2:
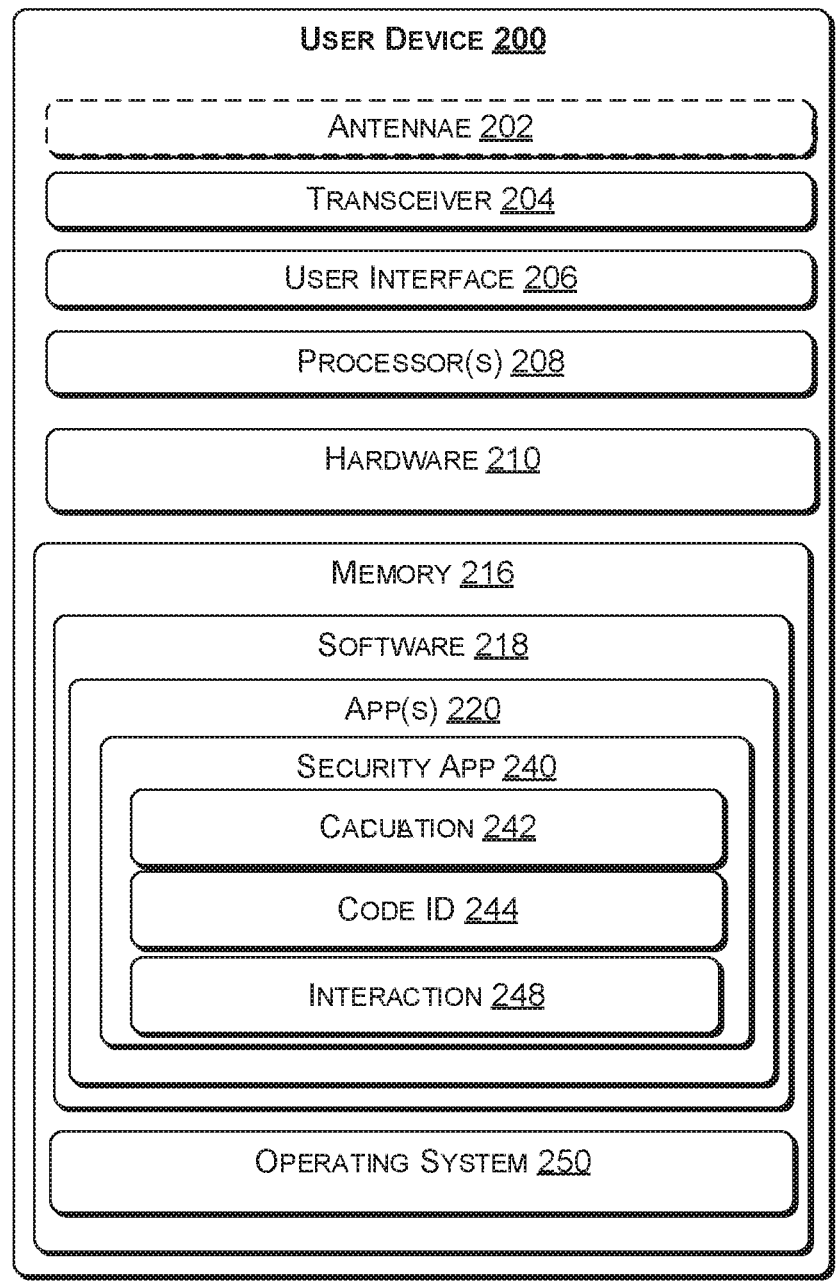
FIG. 2 illustrates a block diagram showing various components of an illustrative user device at a high level.

As discussed in the context of FIG. 1, the data security system of the architecture 100 may involve different types of user devices. To that end, FIG. 2 illustrates a block diagram showing various components of an illustrative user device 200 at a high level. For discussion purposes, the illustration shows the user device 200 in the form of a wireless computing device, while it will be understood that other computing devices are contemplated as well.

The user device 200 may include one or more antennae 202; a transceiver 204 for cellular, Wi-Fi communication, short-range communication technology, and/or wired communication; a user interface 206; one or more processors 208; hardware 210; and memory 216. In some embodiments, the antennae 202 may include an uplink antenna that sends radio signals to a base station, and a downlink antenna that receives radio signals from the base station. In some other embodiments, a single antenna may both send and receive radio signals. The same or other antennas may be used for Wi-Fi communication. These signals may be processed by the transceiver 204, sometimes collectively referred to as a network interface, which is configured to receive and transmit digital data. In one embodiment, the user device 200 does not include an antenna 202 and communication with external components is via wired communication.

In one embodiment, the user device 200 includes a user interface 206 that enables a user to provide input and receive output from the user device 200. For example, the user interface 206 may include a data output device (e.g., visual display, audio speakers, haptic device, etc.,) that may be used to communicate notifications from the security agent 103 of the security server 120.

The user interface 206 may also include one or more data input devices. The data input devices may include, but are not limited to, combinations of one or more of keypads, keyboards, mouse devices, touch screens, microphones, speech recognition packages, and any other suitable devices or other electronic/software selection interfaces. For example, the data input devices may be used to for a user to enter requests and codes that are communicated to the security agent of a security server.

The user device 200 may include one or more processors 208, which may be a single-core processor, a multi-core processor, a complex instruction set computing (CISC) processor, or another type of processor.

The hardware 210 may include a power source and digital signal processors (DSPs), which may include single-core or multiple-core processors. The hardware 210 may also include network processors that manage high-speed communication interfaces, including communication interfaces that interact with peripheral components. The network processors and the peripheral components may be linked by switching fabric. The hardware 210 may further include hardware decoders and encoders, a network interface controller, and/or a USB controller.

The memory 216 may be implemented using computer-readable media, such as computer storage media. Storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device.

The memory 216 may store various software components or modules that are executable or accessible by the processor(s) 208 and controller(s) of the user device 200. The various components of the memory 216 may include software 218 and an operating system 250. The software 218 may include various applications 220. The software 218 may also include a security application 240 having several modules. Each module may include routines, program instructions, objects, and/or data structures that perform tasks or implement abstract data types.

For example, the security application 240 of the user device 200 may include a calculation module 242 operative to determine discrete algorithms based on parameters that are known by the user device, discussed in more detail later. There may be a code identification module 244 operative to determine an identification code of the user device used to communicate with the security agent 103. There may be an interaction module 248 operative for the user device 200 to exchange data with the security agent 103.

The operating system 250 may include components that enable the user device 200 to receive and transmit data via various interfaces (e.g., user controls, communication interface, and/or memory input/output devices), as well as process data using the processor(s) 208 to generate output. The operating system 250 may include a presentation component that presents the output (e.g., display the data on an electronic display of the user device 200, store the data in memory 216, transmit the data to another electronic device, etc.). Additionally, the operating system 250 may include other components that perform various additional functions generally associated with an operating system 250.

Example Processes

Figure 3:
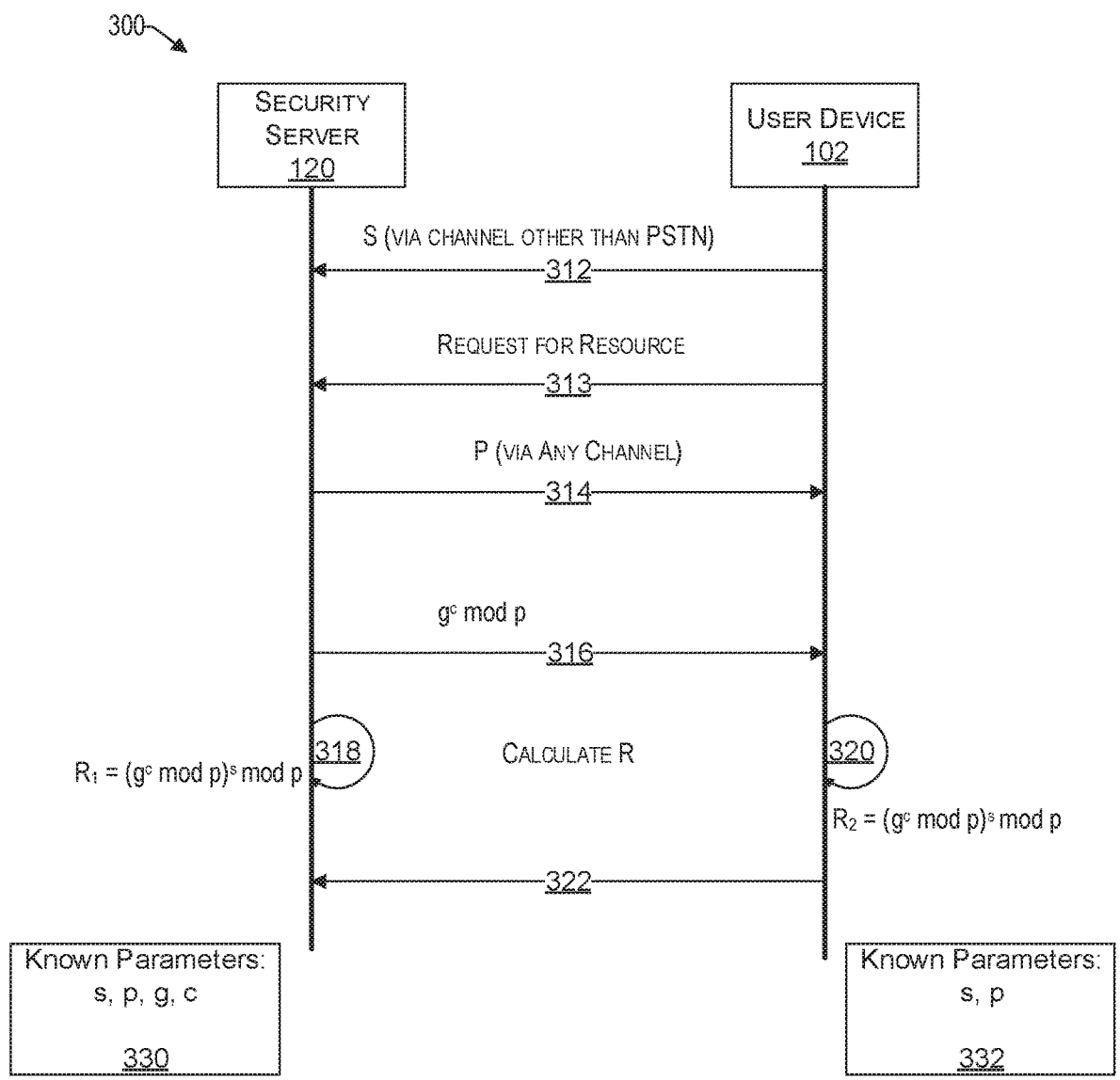
FIG. 3 is an example call flow between a security agent of a security server and a user device in the context of a challenge response mode.
Figure 4:
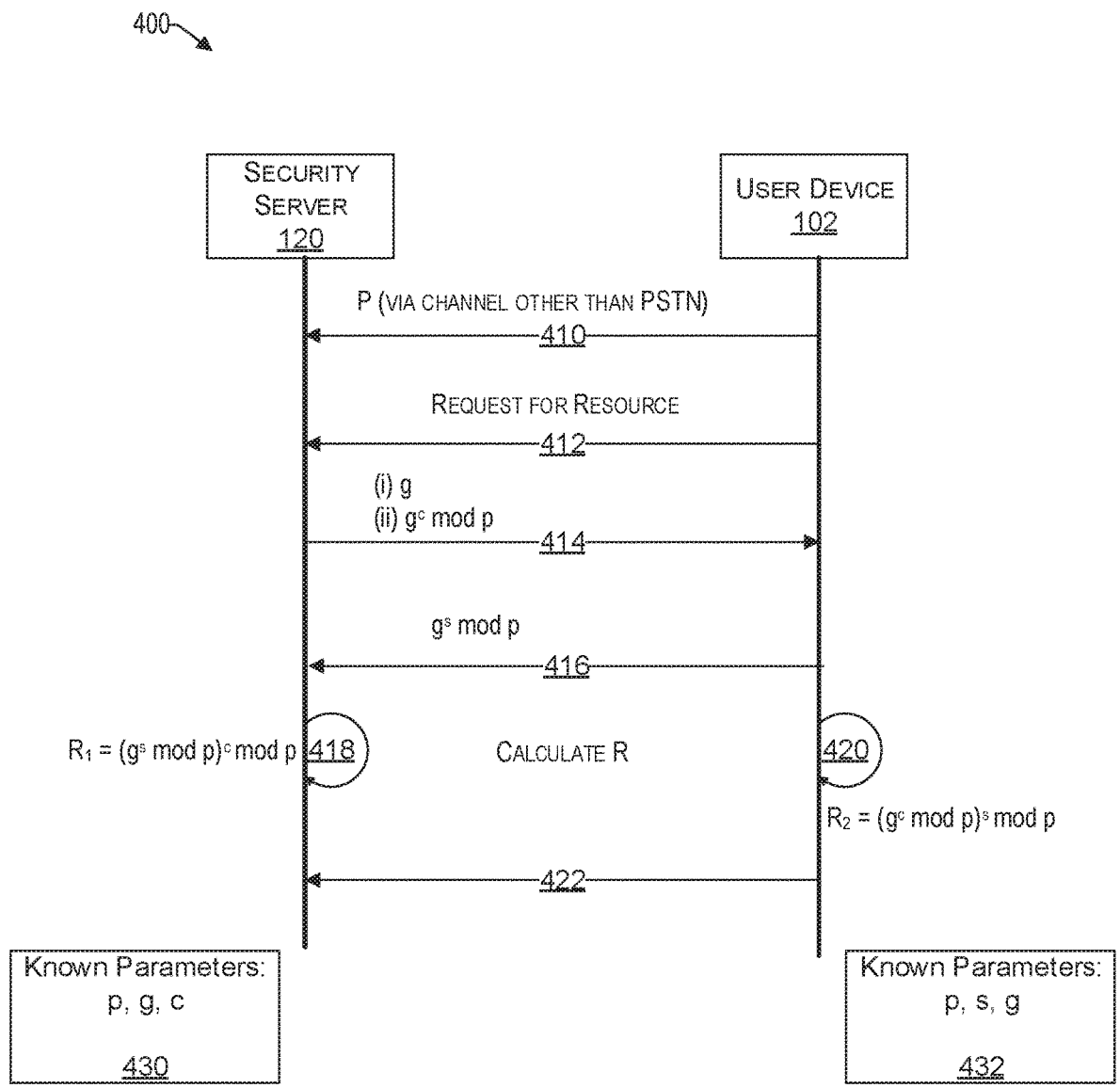
FIG. 4 is an example call flow between a security agent of a security server and a user device in the context of an interactive mode.

With the foregoing overview of the architecture 100 and example user device 200, it may be helpful now to consider a high-level discussion of example processes in the form of call flows. To that end, FIGS. 3 and 4 present illustrative call flows 300 and 400, respectively, between a security agent of a security server 120 and a user device 102. In particular, call flow 300 describes a challenge response mode, and call flow 400 describes an interactive mode between a security server and a user device, consistent with illustrative embodiments.

Call flows 300 and 400 are illustrated as a collection of processes in a logical flowchart, which represents a sequence of operations that can be implemented in hardware, software, or a combination thereof. In the context of software, the processes represent computer-executable instructions that, when executed by one or more processors, perform the recited operations. Generally, computer-executable instructions may include routines, programs, objects, components, data structures, and the like that perform functions or implement abstract data types. The order in which the operations are described is not intended to be construed as a limitation, and any number of the described operations can be combined in any order and/or performed in parallel to implement the process. For discussion purposes, the processes 300 and 400 are described with reference to the architecture 100 of FIG. 1.

In call flow 300, a user (e.g., operator of the user device 102) interacts with a security server 120 to gain access to resources protected by the security server 120. For example, the user device 102 may retrieve secure data from or store secure data to the security server 120, which may be stored in hardware or software. In order to provide access to the resources protected by the security server 120, the user device 102 is authenticated by the security server by a challenge response process described below.

At step 312, the user device 102 sends a predefined number (s) to the security server 120, which may be stored by the security server 120 in a suitable memory. In various embodiments, the predefined number may be an identification number (e.g., code) of the user device 102. In one embodiment, the communication at step 312 is over a channel that is not over PSTN. PSTN is typically related to telephone service and includes telephone lines, microwave transmission links, cellular networks, etc. Instead of PSTN, a technology, such as internet protocol telephony and transmission control protocol/internet protocol (TCP/IP) is used. The TCPIP channel is a common internet protocol for PC, tablet, IOT, and other devices. Accordingly, the communication may be received by the security sever 120 over a WEB-site.

For example, the predefined number (s) may be an identification number of a user device 102 and/or a biometric identifier of the user (thereby providing a layer of hardware protection). In one embodiment, the predefined number (s), sometimes referred to herein as parameter (s), is registered with the security server 120 by physically visiting a local branch of the private network 108, such as a bank, and providing the identification number of the user device 102 as a first parameter (s). For example, the user may manually enter the parameter (s) via a terminal at the local branch of the private network 108 of the security server 120. In other scenarios, the user may use their user device 102 to transmit their information via a short-range communication technology, such as Bluetooth, Wi-Fi, near field communication (NFC), or other suitable sufficiently secure communication technology. In one embodiment, the security server 120 interacts with a profile database 110 to store the predefined number (s) in the profile database 110 to later provide a first factor authentication of a user.

At step 313, the security server 120 receives a request for a resource of the private network 108. For example, an operator of the user device 102 may desire to store or retrieve information from a data repository 112 of the private network 108.

At step 314, the security server 120 creates a first number (p), sometimes referred to herein as a first challenge code, and a second number (g). In one embodiment, the first number (p) is a prime number. The first number (p) is sent to the user device 102 in response to an authorization request from the user device 102. In one embodiment, the first number (p) is sent via a PSTN channel or via https (or another WEB protocol).

At step 316, the security server 120 creates a second number (g). In one embodiment, the second number (g) is smaller than the first number (p) (e.g., 2 or 5). It is noted that second number (parameter) g may be limited by the computing power of computing devices. Stated differently, if g is too large, then it is difficult (if not nearly impossible) to calculate the results from the equations provided herein. In one embodiment, g is a prime number. As computing power increases, parameter g may be a prime number that is larger than 5. The security server 120 also creates a challenge code (c), sometimes referred to herein as the second challenge code. In one embodiment, the challenge code (c) is a number that is larger than the second number (g). In one embodiment, the challenge code (c) changes upon every successful verification of a user device 102.

The security server 120 determines a first discrete logarithm based on the challenge code (c) and the first number (p). The first discrete logarithm is provided by the expression below:

$$\text{First discrete logarithm} \rightarrow (g^c \bmod p) \quad \text{(Eq. 1)}$$

The first discrete logarithm based on the above expression is sent to the user device 102 via a channel that is different from the transmission of the first number (p) in step 314. For example, parameter p may be transferred by SMS. Accordingly, the security server 120 now knows parameters s, p, g, and c, as indicated by block 330. Parameters g and c are not explicitly transmitted to the user device 102. Accordingly, the user device 102 only knows parameters s and p, as indicated by block 332.

At steps 318 and 320 both the security server 120 and the user device 102, respectively, calculate the first pass code R via a second discrete logarithm based on the first discrete logarithm, the predefined number (s), and the first number (p). In various embodiments, the calculation can be performed by the security server 120 and the user device 102 concurrently (e.g., to save time) or sequentially. In one embodiment, the second discrete logarithm is provided by the expression below:

$$\text{Pass Code } R = \text{Second discrete logarithm} \rightarrow (g^c \bmod p)^s \bmod p \quad \text{(Eq. 2)}$$

Accordingly, the security server 120 can calculate the pass code R (i.e., as a first pass code $R_1$) because it has all relevant parameters (i.e., s, p, g, and c) of the second discrete algorithm. Since the user device 102 has received the first discrete logarithm from the security server 120 before and knows parameters s and p, it can determine the pass code R (i.e., as a second pass code $R_2$).

At step 322 the security server 120 receives the second pass code $R_2$ from the user device 102 and compares it to the first pass code $R_1$ it has calculated. Upon determining that the first pass code $R_1$ is identical to the second pass code $R_2$, the security server 120 provides the user device 102 access to the requested resource of the security server 120. For example, the security server 120 can now retrieve protected data from a data repository 112 and send it to the user device 102 over the network 106.

Upon determining that the first pass code $R_1$ is not identical to the second pass code $R_2$, the security server 120 identifies the user device 102 as being unauthorized. In one embodiment, the security server 120 sends an alert notification to an appropriate recipient.

Accordingly, in the challenge-response mode of process 300, the parameters g and c are kept secret by the security server 120. The pass code $R_1$ remains safe from malicious parties unless all three parameters p, s, and c are compromised. Further, different channels of communication may be used for the transfer of some of the parameters during the authentication process. Such approach dramatically increases the difficulty for a malicious party to compromise the system of architecture 100.

Reference now is made to FIG. 4, which illustrates a call flow 400 in the context of an interactive mode between a security server 120 and a user device 102, consistent with an illustrative embodiment. In call flow 400, a user interacts with a security server 120 to gain access to resources protected by the security server 120. In order to provide access to the resources protected by the security server 120, the user device 102 is authenticated by the security server 120 by way of an interactive mode process described below.

At step 410, the user device 102 sends a predefined number (p) to the security server 120, which may be stored by the security server 120 in a suitable memory of the private network 108. In one embodiment, the communication at step 412 is over a channel that is not via PSTN. For example, a technology, such as TCP/IP is used for data security reasons. Accordingly, the communication may be received by the security sever 120 over a WEB-site. In other embodiments, the predefined number (p) may be an identification number of a user device 102 and/or a biometric identifier of the user (thereby providing a layer of hardware protection).

In one embodiment, the predefined number (p), sometimes referred to herein as a first parameter (p), is registered with the security server 120 by physically visiting a local branch of the private network 108, such as a bank, and providing the identification number of the user device 102 as a first parameter (p). For example, the user may manually enter the parameter (p) via a terminal at the local branch of the private network 108 of the security server 120. In other scenarios, the user may use their user device 102 to transmit their predefined number (p) information via a short-range communication technology, such as Bluetooth, Wi-Fi, NFC, etc.

At step 412, the security server 120 receives a request for a resource of the private network 108. For example, an operator of the user device 102 may desire to store or retrieve information from a data repository 112 of the private network 108.

At step 414, the security server 120 creates a first number (c) and a second number (g). In one embodiment, the first number (c) is larger than the second number (g). The security server 120 determines a first discrete logarithm based on the first number (c), the second number (g) and the predefined large number (p). The first discrete logarithm is provided by the expression below:

$$\text{First discrete logarithm} \rightarrow (g^c \bmod p) \quad \text{(Eq. 3)}$$

The second number (g) and the first discrete logarithm are sent to the user device 102 in response to the request for a resource of the private network 108, from the user device 102. In one embodiment, the second number (g) and the first discrete logarithm are both sent in a same digital data packet via a PSTN channel or via https (or another WEB protocol).

At step 416, the user device 102 generates a third number (s). In one embodiment, the third number (s) is larger than the second number (g). The user device 102 also determines a second discrete logarithm based on the received second number (g), the generated third number (s), and the predefined number (p). The second discrete logarithm is provided by the expression below:

$$\text{Second discrete logarithm} \rightarrow (g^s \bmod p) \quad \text{(Eq. 4)}$$

The second discrete logarithm based on the above expression is received by the security server 120 from the user device 102.

At steps 418 and 420, the security server 120 and the user device 102 calculate a first pass code $R_1$ and a second pass code $R_2$, respectively. The first pass code $R_1$, which is determined by the security server 120, is based on the second discrete logarithm (received from the user device 102 in step 416), the first number (c), and the predefined number (p) received in step 410. Inherent within the second passcode is parameter (s), which is obscured by the second discrete logarithm. In one embodiment, the first pass code $R_1$ is provided by the expression of the third discrete logarithm provided below:

$$\text{First Pass Code } R_1 = \text{Third discrete logarithm} \rightarrow (g^s \bmod p)^c \bmod p \quad \text{(Eq. 5)}$$

In contrast, the second pass code $R_2$, which is determined by the user device 102, is based on the first discrete logarithm (received from the security server 120 in step 414), the third number (s), and the predefined number (p). In one embodiment, the second pass code $R_2$ is based on the expression of the fourth discrete logarithm, provided below:

$$\text{Second Pass Code } R_2 = \text{Fourth discrete logarithm} \rightarrow (g^c \bmod p)^s \bmod p \quad \text{(Eq. 6)}$$

At step 422 the security server 120 receives the second pass code $R_2$ from the user device 102 and compares it to the first pass code $R_1$ it has previously calculated. Upon determining that the first pass code $R_1$ is identical to the second pass code $R_2$, the security server 120 provides the user device 102 access to the requested resource of the private network 108. For example, the security server 120 can now retrieve protected data from a data repository 112 and send it to the user device 102 over the network 106.

Upon determining that the first pass code $R_1$ is not identical to the second pass code $R_2$, the security server 120 identifies the user device 102 as being unauthorized. In one embodiment, the security server 120 sends an alert notification to an appropriate recipient.

Accordingly, in the interactive mode of process 400, the parameter c is kept secret by the security server 120. The first and second pass codes $R_1$ and $R_2$ remain safe from malicious parties. Further, since different channels of communication may be used for the transfer of some of the parameters during the authentication process, the difficulty for a malicious party to compromise the system of architecture 100 is dramatically increased.

Example Computer Platform

Figure 5:
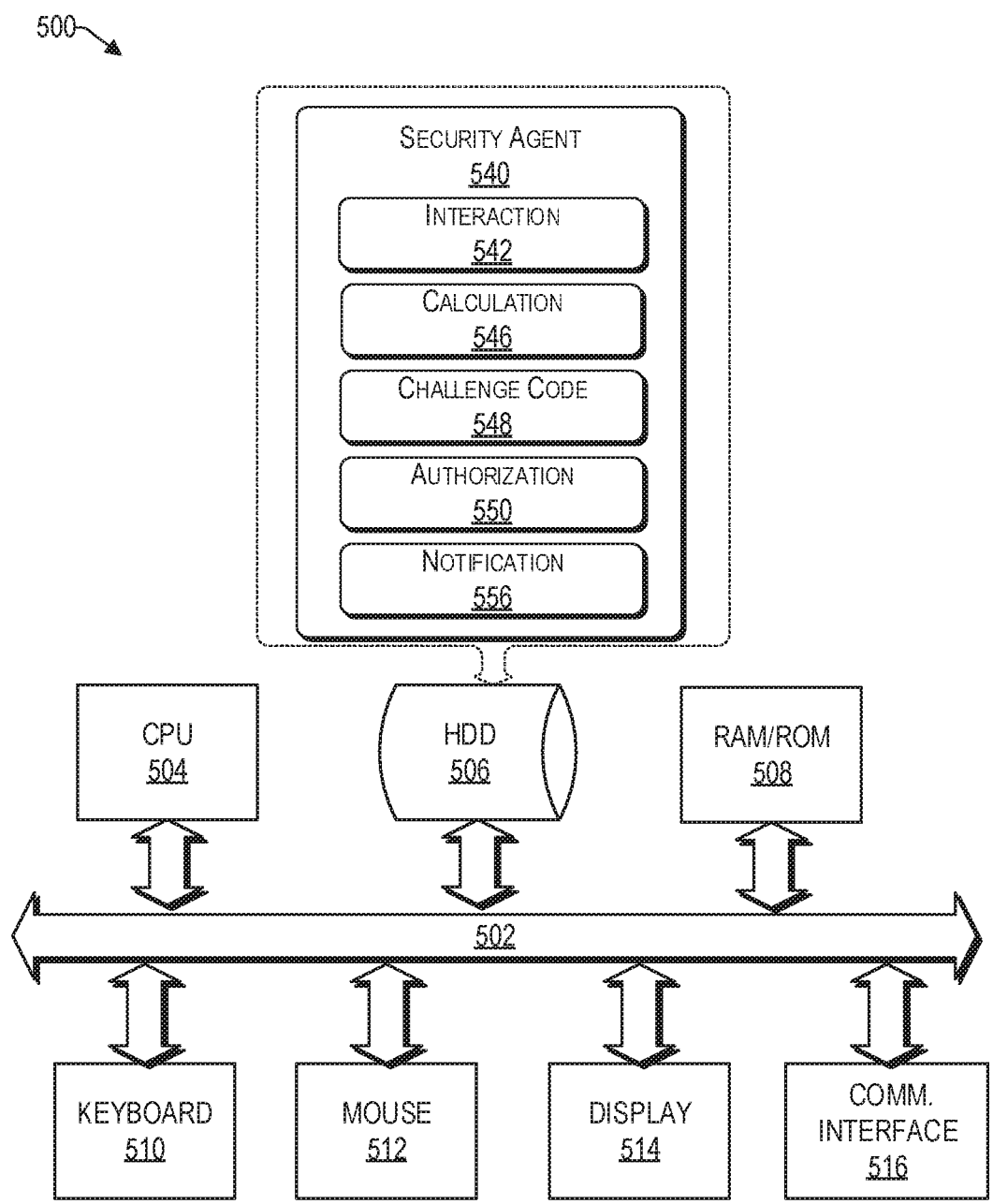
FIG. 5 provides a functional block diagram illustration of a computer hardware platform.

As discussed above, functions relating to providing secure multi-factor authentication, can be performed with the use of one or more computing devices connected for data communication via wireless or wired communication, as shown in FIG. 1 and in accordance with the call flows 300 and 400 of FIGS. 3 and 4. An exemplary computing device in the form of a user device 200 has been discussed above with respect to FIG. 2. FIG. 5 provides a functional block diagram illustration of a computer hardware platform that is capable of providing secure multi-factor authentication. In particular, FIG. 5 illustrates a network or host computer platform 500, as may be used to implement a server, such as the security server 120 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the security agent 540, in a manner described herein. The security agent 540 may have various modules configured to perform different functions.

For example, there may be an interaction module 542 that is operative to receive requests for resources of a private network from user devices. The interaction module 542 can also receive various parameters from and send parameters to user devices. The interaction module 542 may also interact with a profile database to retrieve profile information of a user as a first step in a multi factor authentication process. In embodiments where the data to be protected is in a separate data repository, the interaction module can communicate with such repository to retrieve the relevant data from the data repository and send it to the corresponding user, upon confirming that the user is authorized.

In one embodiment, there is a calculation module 546 operative to calculate various discrete logarithms and passcodes during an authentication process. The calculation module 546 can also be used to determine whether a first pass code $R_1$ is identical to a second pass code $R_2$.

In one embodiment, there is a challenge code module 548 operative to generate various challenge codes that can be used during an authentication process. In one embodiment, the challenge code changes upon every transaction with an authorized user. Stated differently, a challenge code is exhausted upon every successful interaction with an authorized user.

In one embodiment, there is an authorization module 550 operative to allow an operator of a user device to receive resources of a private network 108 upon determining that the passcode provided by the user device corresponds with a passcode calculated by the security agent.

In one embodiment, there is a notification module 556 operative to alert an appropriate recipient upon determining that a user requesting access to a private network is not authorized. An appropriate recipient may be the account holder (i.e., user), an IT administrator of the private network, a security agent of the private network, etc.

In one embodiment, a program, such as Apache™, can be stored for operating the system as a Web server. In one embodiment, the HDD 506 can store an executing application that includes one or more library software modules, such as those for the Java™ Runtime Environment program for realizing a JVM (Java™ virtual machine).

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a network interface coupled to the processor to enable communication over a network;
a storage device coupled to the processor;
a security agent software stored in the storage device, wherein the processor, when executed by the security agent software, is configured to perform acts comprising:
receiving a request for a resource from a user device;
receiving a predefined number (p) from the user device;
creating a first number (c) and a second number (g);
determining a first discrete logarithm based on the first number (c) and the predefined number (p);
sending the first discrete logarithm and the second number (g) to the user device;
receiving a second discrete logarithm from the user device based on a third number (s) generated by the user device, the predefined number (p), and the second number (g), from the user device;
calculating a first pass code ($R_1$) via a third discrete logarithm, based on the second discrete logarithm, the first number (c), and the predefined number (p);
receiving a second pass code ($R_2$) via a fourth discrete logarithm, based on the first discrete logarithm, the third number (s), and the predefined number (p), from the user device;
comparing the first pass code ($R_1$) to the second pass code ($R_2$); and
upon determining that the first pass code ($R_1$) is identical to the second pass code ($R_2$), allowing the user device to access the resource, wherein the computing device keeps the first number (c) and the second number (g) secret.

2. The computing device of claim 1, wherein the predefined number (p) is an identification (ID) number of the user device.

3. The computing device of claim 1, wherein the predefined number (p) is received over a Hypertext Transfer Protocol Secure (HTTPS) channel.

4. The computing device of claim 1, wherein the first discrete logarithm and the second number (g) sent to the user device is via a public switched telephone network (PSTN) channel.

5. The computing device of claim 1, wherein the receipt of the predefined number (p) by the computing device is over a channel that is different from that of sending the first discrete logarithm and the second number (g) to the user device.

6. The computing device of claim 1, wherein the first discrete logarithm is based on ($g^c$ mod p).

7. The computing device of claim 6, wherein the second discrete logarithm is based on ($g^s$ mod p).

8. The computing device of claim 7, wherein the third discrete logarithm is based on (($g^s$ mod p)$^c$ mod p).

9. The computing device of claim 8, wherein the fourth discrete logarithm is based on (($g^c$ mod p)$^s$ mod p).

10. The computing device of claim 1, wherein execution of the security agent by the processor further configures the computing device to perform acts, comprising:
upon determining that the first pass code ($R_1$) is not identical to the second pass code ($R_2$), sending an alert to an account of a user associated with the requested resource.

11. The computing device of claim 1, wherein execution of the security agent by the processor further configures the computing device to perform acts, comprising:
upon determining that the first pass code ($R_1$) is identical to the second pass code ($R_2$), changing the challenge code.

12. A non-transitory computer readable storage medium tangibly embodying a computer readable program code having computer readable instructions that, when executed, causes a computer device to carry out a method of authenticating a user, the method comprising:
receiving a request for a resource from a user device;
receiving a predefined number (p) from the user device;
creating a first number (c) and a second number (g);
determining a first discrete logarithm based on the first number (c) and the predefined number (p);
sending the first discrete logarithm and the second number (g) to the user device;

receiving a second discrete logarithm from the user device based on a third number (s) generated by the user device, the predefined number (p), and the second number (g), from the user device;

calculating a first pass code ($R_1$) via a third discrete logarithm, based on the second discrete logarithm, the first number (c), and the predefined number (p);

receiving a second pass code ($R_2$) via a fourth discrete logarithm, based on the first discrete logarithm, the third number (s), and the predefined number (p), from the user device;

comparing the first pass code ($R_1$) to the second pass code ($R_2$); and upon determining that the first pass code ($R_1$) is identical to the second pass code ($R_2$), allowing the user device to access the resource, wherein the computer device keeps the first number (c) secret.

13. The non-transitory computer readable storage medium of claim 12, wherein the predefined number (p) is an identification (ID) number of the user device.

14. The non-transitory computer readable storage medium of claim 12, wherein the predefined number (p) is received over a Hypertext Transfer Protocol Secure (HTTPS) channel.

15. The non-transitory computer readable storage medium of claim 12, wherein the receipt of the predefined number (p) by the computing device is over a channel that is different from that of sending the first discrete logarithm and the second number (g) to the user device.

16. The non-transitory computer readable storage medium of claim 12, wherein the first discrete logarithm is based on ($g^c$ mod p).

17. The non-transitory computer readable storage medium of claim 16, wherein the second discrete logarithm is based on ($g^s$ mod p).

18. The non-transitory computer readable storage medium of claim 17, wherein:
the third discrete logarithm is based on (($g^s$ mod p)$^c$ mod p), and
the fourth discrete logarithm is based on (($g^c$ mod p)$^s$ mod p).

19. The non-transitory computer readable storage medium of claim 12, further comprising:
upon determining that the first pass code ($R_1$) is not identical to the second pass code ($R_2$), sending an alert to an account of a user associated with the requested resource.

20. The non-transitory computer readable storage medium of claim 12, further comprising:

upon determining that the first pass code ($R_1$) is identical to the second pass code ($R_2$), changing the challenge code.

21. A computing device comprising:
a processor;
a network interface coupled to the processor to enable communication over a network;
a storage device coupled to the processor;
a security agent software stored in the storage device, wherein the processor, when executed by the security agent software, is configured to perform acts comprising:
sending a request for a resource, from the computing device to a server;
sending a predefined number (p) to the server;
receiving (i) a first discrete logarithm based on the first number (c) and the predefined number (p) and (ii) and the second number (g) from the server;
generating a third number (s);
determining a second discrete logarithm based on a third number (s), the predefined number (p), and the second number (g);
sending the second discrete logarithm to the server;
calculating a second pass code ($R_2$) via a fourth discrete logarithm, based on the first discrete logarithm, the third number (s), and the predefined number (p);
sending the second pass code ($R_2$) to the server for comparison to a first pass code $R_1$ based on the second discrete logarithm, the first number (c), and the predefined number (p); and
receiving access to the secure resource upon the second pass code ($R_2$) being identical to the first pass code ($R_1$), wherein the computer device keeps the first number (c) secret.

22. The computing device of claim 21, wherein the predefined number (p) is an identification (ID) number of the user device.

23. The computing device of claim 21, wherein the sending of the predefined number (p) by the computing device is over a channel that is different from that of receiving the first discrete logarithm and the second number (g) from the server.

24. The computing device of claim 21, wherein:
the first discrete logarithm is based on ($g^c$ mod p),
the second discrete logarithm is based on ($g^s$ mod p),
the third discrete logarithm is based on (($g^s$ mod p)$^c$ mod p), and
the fourth discrete logarithm is based on (($g^c$ mod p)$^s$ mod p).

* * * * *